United States Patent [19]

Reithel et al.

[11] 4,450,215
[45] May 22, 1984

[54] COLOR FILTER ELEMENTS COMPRISING HEXAALKOXYMETHYLMELAMINE BARRIER LAYERS

[75] Inventors: Raymond F. Reithel; Armin K. Weiss, both of Rochester, N.Y.

[73] Assignee: Eastman Kodak Company, Rochester, N.Y.

[21] Appl. No.: 501,225

[22] Filed: Jun. 6, 1983

[51] Int. Cl.³ .............................................. G02B 5/22
[52] U.S. Cl. ................................ 430/7; 430/4; 430/293; 430/321; 350/316
[58] Field of Search ................ 430/7, 4, 293, 321, 430/374, 274, 289; 350/316; 428/203, 207, 212

[56] References Cited

U.S. PATENT DOCUMENTS

| | | | |
|---|---|---|---|
| 3,284,394 | 11/1966 | Sven | 260/29.6 |
| 3,306,865 | 2/1967 | Wheeler | 260/21 |
| 3,409,556 | 11/1968 | Bruner | 260/300 |
| 3,418,392 | 12/1968 | Leitner | 525/110 |
| 3,661,819 | 5/1972 | Koral | 260/21 |
| 3,723,393 | 3/1973 | Kistner | 260/77.5 B |
| 3,753,709 | 8/1973 | Staudenmayer | 96/1.5 |
| 3,900,672 | 8/1975 | Hammond | 428/334 |
| 4,355,087 | 10/1982 | Martin | 430/7 |
| 4,357,415 | 11/1982 | Hartman | 430/293 |

OTHER PUBLICATIONS

CA84-67842d.
CA84-37322s.

Primary Examiner—Mary F. Downey
Attorney, Agent, or Firm—John R. Everett

[57] ABSTRACT

A color filter element comprising at least two differently colored sets of color arrays and having a barrier layer separating the sets to prevent color contamination between the sets is disclosed. The barrier layer is an optically clear polymerized, crosslinked hexaalkoxymethylmelamine monomer. The element is useful in color imaging devices.

10 Claims, No Drawings

COLOR FILTER ELEMENTS COMPRISING HEXAALKOXYMETHYLMELAMINE BARRIER LAYERS

FIELD OF THE INVENTION

This invention relates to color filter elements comprising barrier layers and to color imaging elements comprising such color filter elements.

BACKGROUND OF THE INVENTION

Many of the early methods of color photography operated by virtue of an additive color screen or color filter element in registration with a suitable silver image. In these methods, a silver image is formed by imagewise exposing a silver halide layer through the screen so as to produce a color image record. The silver halide layer is then developed so as to produce a positive image corresponding to the color image record. This silver image, when viewed in proper registration through the same screen, produces a color reproduction of the original image. This additive photographic process has been used to produce a diffusion transfer transparency material.

Recently, the additive photographic process has been adapted to produce what are called "single-site" color imaging devices. In a device of this type, a color filter element, comprising at least one color array set, is registered with an array of panchromatically sensitive elements in a solid-state imaging device. The solid-state imaging device is generally formed from a silicon wafer. The surface of the wafer is processed to produce a number of arrays of solid-state photosensitive areas sometimes called pixels. By proper selection of the color of each set of color arrays used in the color filter element, a color image can be extracted from a single solid-state device.

Methods of making color filter elements are known. In a typical process, a support is coated with a radiation sensitive dyeable composition such as dichromated gelatin. The resultant layer is then exposed to activating radiation. The element is then washed, preferably with water, to remove the unexposed portions of the layer. The remaining exposed portions of the layer, in the form of stripes, squares or islands in a desired size and shape are then dyed with a suitable dye solution to form a first color array set. This process is repeated to make other differently colored sets of color arrays to form a multicolor filter element. Where there is a problem of dye contamination or dye leaching between the differently colored sets of filter arrays in the element, barrier layers have been provided to separate the sets thereby ameliorating the problem of dye contamination or dye leaching.

Barrier layers formed from photoresist formulation are often used in color filter elements. The problem is that such barrier layers frequently exhibit a visible, yellow color, indicating blue absorption by the layer. Such absorption by the barrier layer is detrimental in solid-state imaging devices which frequently have low blue sensitivity, depending on sensor design.

SUMMARY OF THE INVENTION

The present invention provides a color filter element comprising at least two differently colored sets of color arrays and having a barrier layer separating the sets to prevent color contamination between the sets characterized in that the barrier layer is an optically clear polymerized, crosslinked hexaalkoxymethylmelamine monomer.

The barrier layer is transparent to visible radiation. Moreover, a color array set overlying the barrier layer lies substantially in the same plane. The barrier layer not only conforms to the underlying topography of the color filter array upon which it is coated but it tends to level its own surface. This planing effect occurs because the hexaalkoxymethylmelamines fill in any recessed features in the topography of any layer over which it is coated. The barrier layer is a continuous tough film which effectively prevents color contamination or color leaching between different sets of color filter arrays. It is also impervious to the solvents used in forming subsequent layers of the color filter element.

Since the barrier layer is optically clear, it does not exacerbate the problem of low blue sensitivity of many solid-state imaging devices. Thus, the present invention also provides color imaging devices, particularly solid-state color imaging devices comprising a radiation-sensitive surface having superimposed thereon a color filter element having (a) at least two differently colored sets of color arrays and (b) a barrier layer separating the sets characterized in that the barrier layer is an optically clear polymerized, crosslinked hexaalkoxymethylmelamine monomer.

DETAILS OF THE INVENTION

The barrier layers used in the color filter elements of the invention are formed by overcoating a previously formed color filter array set with a coating composition containing the selected hexaalkoxymethylmelamine, an acid catalyst to promote crosslinking and a solvent.

The selected hexaalkoxymethylmelamine must result in an optically clear layer to be useful. Particularly preferred hexaalkoxymethylmelamines are selected from those having the formula:

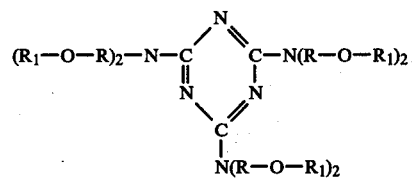

wherein R represents —CH$_2$— or

and R$_1$ is a straight or branched chain, lower alkyl radical having up to about 8 carbon atoms such as methyl, butyl, octoyl, isopropyl and neopentyl. Preferably R is —CH$_2$— and R$_1$ is an alkyl radical of from 1 to about 4 carbon atoms such as methyl, ethyl and butyl. It is especially preferred to use the hexaalkoxymethylmelamines wherein R$_1$ is the methyl radical.

Such hexaalkoxymethylmelamines are prepared by well-known procedures, such as those disclosed in U.S. Pat. No. 3,306,865.

Examples of acid catalysts used to promote the polymerization and crosslinking of the selected hexaalkoxymethylmelamine monomer included in the above-described coating composition include maleic acid, trimellitic acid, phthalic acid, alkylphosphoric acid and para-toluene sulfonic acid.

Solvents for the coating composition include water, water-alcohol mixture (about 1:1 to 1:5), ethanol, butanol, isopropanol, toluene, cellosolve acetate, butyl acetate, methylisobutyl ketone and Solvesso 150 TM.

The concentration of the selected hexaalkoxymethylmelamine monomer in the coating solvent is not critical. Concentrations from 5 weight percent up to a saturated solution are useful. Sufficient acid catalyst is included to promote complete polymerization and crosslinking of the hexaalkoxymethylmelamine monomer. Thus, the amount of acid promoter included varies according to the concentration of the hexaalkoxymethylmelamine monomer in the coating solvent. Concentrations of acid catalyst from about 0.5 to about 10 weight percent solids are useful, although amounts in excess of this range are also useful.

A method of making the color filter elements of this invention involves the steps of:

(a) forming a layer of a transparent photosensitized dyeable composition on a surface such as a transparent film support or an image forming surface such as a silver halide emulsion layer, a photoconductive layer or a solid-state imaging surface;

(b) exposing the layer, through a mask, to radiation to which it is sensitive;

(c) removing the unexposed portion of the layer;

(d) dyeing the remaining exposed portion of the layer to form a first color array set;

(e) overcoating the first color array set with the hexaalkoxymethylmelamine barrier layer coating composition;

(f) removing the solvent from the coated barrier layer composition;

(g) heating the barrier layer to promote polymerization and crosslinking thereof; and (h) repeating steps (a)–(g) with different dyes to form the desired number of color filter array sets in the color filter element.

Of course, it is unnecessary to use the barrier layer over the last formed array set or between color array sets that do not interact chemically.

Optionally subbing layers may be used in the color filter elements of the invention between a particular color array set and the barrier layer to promote adhesion. Useful subbing layers may be formed from hexalkyldisilazanes and tetraalkylorthotitanates. Preferred subbing layers include a 5–30 weight percent solution of hexamethyldisilazane in xylene. Another useful subbing layer can be formed from gelled nitrate. Gelled nitrate is a composite solution of gelatin and cellulose nitrate in an appropriate solvent. Such layers are disclosed in Glafkides, "Photographic Chemistry" Vol. 1, English Edition, page 468 (1958).

The dyeable composition is photosensitive or is made photosensitive prior to coating. The dyeable composition generally comprises a polymer which itself is photosensitive or a polymer which is mixed with a photosensitizer. If the polymer itself is photosensitive, it preferably contains sites which crosslink the polymer when the sites are exposed to activating radiation such as UV radiation. If the polymer is mixed with a separate sensitizer, the polymer is preferably a natural colloid such as gelatin, and the sensitizer is a dichromate compound. Ammonium, sodium or potassium dichromate are useful. Sufficient dichromate sensitizer is included in the gelatin to insure complete crosslinking of the gelatin in exposed areas. This amount will vary depending upon gelatin concentration. Amounts of from 1% to 40% based on gelatin weight are useful.

Particularly preferred dyeable compositions include hydrophilic colloids, such as gelatin, which are photosensitized with a dichromate compound. One such sensitizable gelatin is Norland Photoengraving Glue. Gelatin is generally made from collagen-containing materials such as bovine skin, bovine cartilage, calfskin, pigskin and the like. Methods of preparing gelatin are well-known in the art and are described, for example, by R. J. Croome and F. G. Clegg, *Photographic Gelatin,* The Focal Press, London, 1965, and A. Veis, *The Macromolecular Chemistry of Gelatin,* Academic Press, New York, 1964.

Other dyeable photosensitive compositions include bichromated polyamides and bichromated poly(vinyl alcohols).

The dyeable dichromated hydrophilic colloid compositions optionally contain other components such as alginic acid esters such as guanadine, gelatin substitutes and modifiers such as poly(vinyl alcohol) and poly(vinyl pyrrolidone), and other components which do not interfere with the photosensitive properties of the dichromated hydrophilic colloids.

One particularly useful additional component is a latex polymer. The latex polymers are added to give the dichromated gelatin compositions improved resolution and adhesion. The latex polymers which are added to the dichromated hydrophilic colloid photosensitive compositions are derived from monomers which form water-insoluble homopolymers and a small amount of monomers which form water-soluble homopolymers. These improved photosensitive compositions are described in U.S. Pat. No. 4,264,706 to Sutton and Martin issued Apr. 28, 1981.

Useful dyes are selected based on the selected dyeable composition or vice-versa. Where the dyeable composition comprises a hydrophilic colloid such as gelatin, useful dyes include acid and basic dyes. Hydrophilic colloids are also dyed by treating the hydrophilic colloid with a metal salt and then treating it with a solution of a metalizable dye or vice-versa.

One particularly suitable class of dyes for dyeing hydrophilic colloids, such as gelatin, is the reactive dye. Reactive dyes are those dyes which have a group which is capable of reacting with a site in the photosensitive dyeable composition, thereby forming a covalent bond. These reactive groups generally react with the amino groups in gelatin to form a highly stable dyed filter element. Examples of suitable reactive groups are well-known in the art and are described, for example, in U.S. Pat. No. 3,884,626, column 1, line 39, through column 3, line 45, and in U.S. Pat. No. 3,669,608, column 3, line 50, through column 4, line 69. These references also disclose dyes which contain reactive groups which are useful in the color filter elements of the present invention.

Reactive dyes are well-known in the art and are commercially available. Useful dyes are available under the name Drimarene TM available from Sandoz Color and Chemicals, Inc., Remazol TM available from American Hoechst Corp. and Procion TM available from ICI United States, Inc.

Color imaging elements result when the color filter element is formed on a radiation-sensitive surface. Preferably, the radiation-sensitive surface is solid-state, comprising an array of solid-state charge-handling photosensors. Examples of photosensors include charge-coupled devices (also known as charge-coupled imagers, charge-transfer devices, charge-transfer imagers and the like), charge-injection devices, bucket-brigade devices, diode arrays and combinations of these. Useful solid-state imaging devices are described, for example, in U.S. Pat. Nos. 3,801,884; 3.971,065; 3,982,274; 4,054,906 and 4,054,915.

A variety of methods can be used to coat the photosensitive dyeable composition, such as spray coating, air knife coating and the like. The preferred method is to spin-coat a solution of the photosensitive dyeable composition on the imaging surface of the solid-state imaging device. It is generally desirable to maintain the thickness of the coated photosensitive dyeable composition less than about 10 $\mu$m.

Following coating and drying of a layer of the photosensitive dyeable composition, the layer is exposed through a patterned mask which represents the negative pattern of the desired color array set. The exposure is made with light to which the photosensitive composition is sensitive, generally UV radiation. (Areas which have been exposed are made insoluble by the exposure.) After the photosensitive layer is exposed, it is rinsed in a solvent for the composition to remove the unexposed dyeable material. If a hydrophilic colloid such as dichromated gelatin is used as the photosensitive dyeable composition, water is preferably used in this rinsing step. The result is an array set which correspond to the color mask.

The set of arrays are then dyed to order to produce a first color array set. If a hydrophilic colloid is the dyeable material, and a reactive dye is used, this dyeing step is conveniently carried out by simply immersing the layer in a water solution of the reactive dye. In these preferred embodiments, where dichromated gelatin is used with reactive dyes, the pH of the dye solution is selected so as to promote the rapid dyeing of the dichromated gelatin. Reactive dyes with reactive groups containing aromatic ring structures are most reactive with dichromated gelatin in the pH range of about 2.0 to 3.0. Dyes with a sulfato ethyl sulfonyl group are most reactive at a pH of about 5.0. For a given dye and a given dyeable composition, the optimum pH can be determined by simple experiment. The concentration of dye in the dyeing solution varies over a wide range. Generally, the dye concentration is above about 2 g/100 mL up to the solubility limit of the dye, although lower concentrations are useful. Usually, dyeing is complete in about 20 seconds to about 8 minutes. Temperatures above room temperature are sometimes useful in this dyeing step.

The thus formed first color array set is dried. The barrier layer coating composition is then coated over the first color array set. The solvent is removed from the latter composition by heating, evaporation or any other technique. After solvent removal, the thus formed layer is heated to promote polymerization and crosslinking of the selected hexaalkoxymethylmelamine monomer.

The above steps are repeated to form the number of additional color array sets desired.

If the radiation-sensitive surface is the surface of a solid-state imaging device, the color filter element must be in microregistration with the underlying array of photosensors. As used herein, the term "microregistration" means that the color array sets of the color filter element and the photosensor array are precisely aligned on a micron scale. In other words, the position of a color array set is less than about 1 micron away from its intended position with respect to the photosensor array.

The method of forming the color filter elements of this invention is illustrated in the following example.

EXAMPLE

The following dye baths were prepared:
Dye Bath A (Red)
2.0 g Drimarene Scarlet R-3G
100 cc distilled $H_2O$
adjusted to pH of 2.0 with dilute HCl
Dye Bath B (Blue)
2.0 g Procion Blue MX-G
100 cc distilled $H_2O$
adjusted to pH of 3.0 with dilute HCl
Dye Bath C (Green)
1.5 g Drimarene Brilliant Yellow K-3GL
1.5 g Remazol Brilliant Green 6B
100 cc Distilled $H_2O$
adjusted to pH of 3.5 with dilute HCl The barrier layer solution used in this example contained 26 g of hexamethoxymethylmelamine, 75 g of isopropyl alcohol and 1 g of para-toluenesulfonic acid. The composition was mixed and stirred for 2 hours and then pressure filtered through a filter element of 1 micrometer average pore size.

A first color array set was formed by spin coating a photosensitive dyeable composition containing Norland Photoengraving Glue and Dichromate Sensitizers. It was spin coated at about 4700 rpm onto a glass wafer. The wafer was exposed through a chromium pattern mask, designated as the Red mask. The unexposed dyeable composition was washed off in flowing distilled water for about 1 minute. The wafer was then bathed in Dye Solution A for 2 minutes and then rinsed in distilled water for 10 seconds. The thus formed first color array set was heated at about 130° C. for about 10 minutes to remove residual moisture from the color array set.

The barrier layer coating composition was then spin coated over the above first formed color array set. The spin coating was carried out at about 2000 rpm for about 2 minutes. The barrier layer was heated to 130° C. for 5 minutes to remove excess solvent and to promote polymerization and crosslinking of the hexamethoxymethylmelamine. The barrier layer was a continuous tough film. The film was optically clear and its upper, free surface was planar. Planarization was determined by scanning electron microscopy of cross-sectioned samples of the film.

The foregoing steps were repeated a second time with Dye Bath B to form a second color array set overcoated with the same barrier layer overcoating the first color array set. This barrier layer was also a continuous tough film that was optically clear. It was also observed that the first barrier layer remained optically clear after being subjected to the solutions including the dyes used to form the second color array set.

The above steps were repeated a third time with Dye Bath C to form a third color array set. The third color array set was not overcoated with the barrier since no possibility of contamination or dye leaching existed because each prior color array set had been overcoated with the barrier layer.

The invention has been described in detail with particular reference to preferred embodiments thereof, but it will be understood that variations and modifications can be effected within the spirit and scope of the invention.

What is claimed is:

1. A color filter element comprising at least two differently colored sets of color arrays and having a barrier layer separating the sets characterized in that the barrier layer is an optically clear polymerized, crosslinked hexaalkoxymethylmelamine monomer.

2. The color filter element of claim 1 wherein the barrier layer is a polymerized, crosslinked hexaalkoxymethylmelamine monomer having the structure:

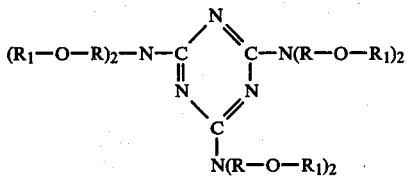

wherein R represents —CH$_2$— or

and R$_1$ is a straight or branched chain, lower dye radical having up to 8 carbon atoms.

3. The color filter element of claim 1 wherein the barrier layer is polymerized, cross-linked hexamethoxymethylmelamine.

4. The color filter element of claim 1 comprising at least three differently colored sets of color arrays with a barrier layer separating at least one of the sets from the other sets.

5. The color filter element of claim 1 wherein one surface of the barrier layer is leveled such that an entire color array set overlying the barrier layer lies in substantially the same plane.

6. A color imaging element comprising a radiation-sensitive surface having superimposed thereon a color filter element having (a) at least two differently colored sets of color arrays and (b) a barrier layer separating the sets characterized in that the barrier layer is an optically clear polymerized, crosslinked hexaalkoxymethylmelamine monomer.

7. A solid-state color imaging element comprising a radiation-sensitive surface having superimposed thereon in geometrical registration a color filter element having (a) at least two differently colored sets of color arrays and (b) a barrier layer separating the sets characterized in that the barrier layer is an optically clear polymerized, crosslinked hexaalkoxymethylmelamine monomer.

8. The element of claim 6 or 7 wherein the barrier layer is a polymerized crosslinked hexaalkoxymethylmelamine monomer having the structure:

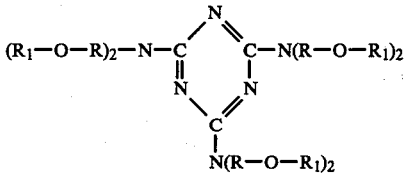

wherein R represents —CH$_2$— or

and R$_1$ is a straight or branched chain, lower alkyl radical having up to about 8 carbon atoms.

9. The element of claims 6 or 7 wherein the polymerized crosslinked monomer is hexamethoxymethylmelamine.

10. The element of claim 6 or 7 wherein the color filter element comprises at least three differently colored sets of color arrays with the barrier layer separating at least one of the sets from the other sets.

* * * * *